United States Patent [19]
Okada et al.

[11] Patent Number: 5,132,840
[45] Date of Patent: Jul. 21, 1992

[54] CLEANING APPARATUS FOR AUTOMOTIVE REAR VIEW MIRROR

[75] Inventors: Shoji Okada, Toyota; Naofumi Fujie, Nagoya; Tomoaki Imaizumi, Aichi; Koji Ito, Kariya all of Japan

[73] Assignee: Aisin Seiki Kabushiki Kaisha, Kariya, Japan

[21] Appl. No.: 464,011

[22] Filed: Jan. 12, 1990

[30] Foreign Application Priority Data

Jan. 12, 1989 [JP] Japan ................................ 1-7112
Jan. 25, 1989 [JP] Japan ................................ 1-17050

[51] Int. Cl.$^5$ .......................... B60R 1/06; G02B 5/08; F26B 3/353; F26B 5/02
[52] U.S. Cl. ................................. 359/512; 359/507; 219/219; 15/250.02
[58] Field of Search ............. 350/582, 588; 15/250 R, 15/250 B; 310/321-324; 219/219

[56] References Cited

U.S. PATENT DOCUMENTS

| | | | |
|---|---|---|---|
| 3,624,347 | 11/1971 | Anderson et al. | 350/588 |
| 3,686,473 | 8/1972 | Shirn | 350/588 |
| 4,387,973 | 6/1983 | Martin | 350/608 |
| 4,634,242 | 1/1987 | Taguchi et al. | 350/588 |
| 4,833,373 | 5/1989 | Doi et al. | 350/582 |

FOREIGN PATENT DOCUMENTS

| | | | |
|---|---|---|---|
| 60-17402 | 1/1095 | Japan | 350/588 |
| 59-8548 | 1/1984 | Japan . | |
| 61-30552 | 2/1986 | Japan . | |
| 62-238149 | 10/1987 | Japan . | |
| 62-191550 | 12/1987 | Japan . | |

*Primary Examiner*—Jon W. Henry
*Attorney, Agent, or Firm*—Burns, Doane, Swecker & Mathis

[57] ABSTRACT

A cleaning arrangement for an outside rear view mirror of an automobile cleans and removes frost, ice and water droplets from the mirror. A heating element is provided to quickly heat and melt frost and ice into water droplets. A piezoelectric element is provided to vibrate the mirror to cause water droplets to be atomized and removed from the mirror.

3 Claims, 9 Drawing Sheets

CLEANING APPARATUS FOR AUTOMOTIVE REAR VIEW MIRROR

BACKGROUND OF THE INVENTION

1. Field of the Invention

This invention relates to an automotive rear view mirror, and more particularly relates to a cleaning apparatus for removing foreign substances from a surface of the mirror.

2. Description of the Related Art

Japanese utility model laid open patent No. 59-40145 published on Mar. 14, 1984 and Japanese utility model laid open patent No. 61-30552 published on Feb. 24, 1986 disclose the cleaning apparatus for an automotive rear view mirror.

Figure 17:
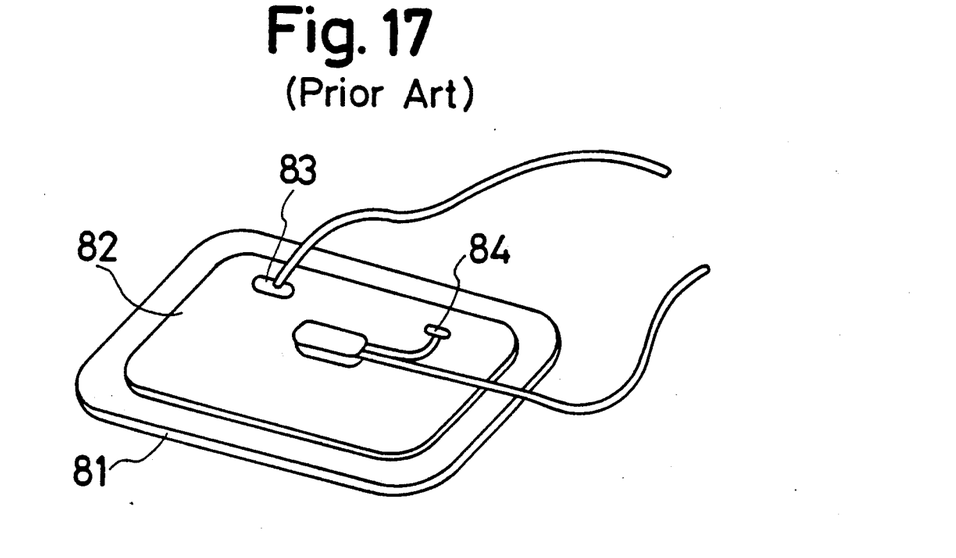
FIG. 17 is a perspective view of a conventional automotive rear view mirror.

FIG. 17 is a perspective view of the cleaning apparatus disclosed in the laid open patent No. 59-40145. Therein, a planer heater 82 is adhered to a back side of a mirror 81. The heater 82 has a pair of electrodes 83, 84. The mirror 81 is heated by the heater 82 when electric power is supplied to the electrodes 83, 84. When the mirror 81 is heated to a pre-determined temperature, water droplets are evaporated and removed from the surface of the mirror 81.

Figure 16:
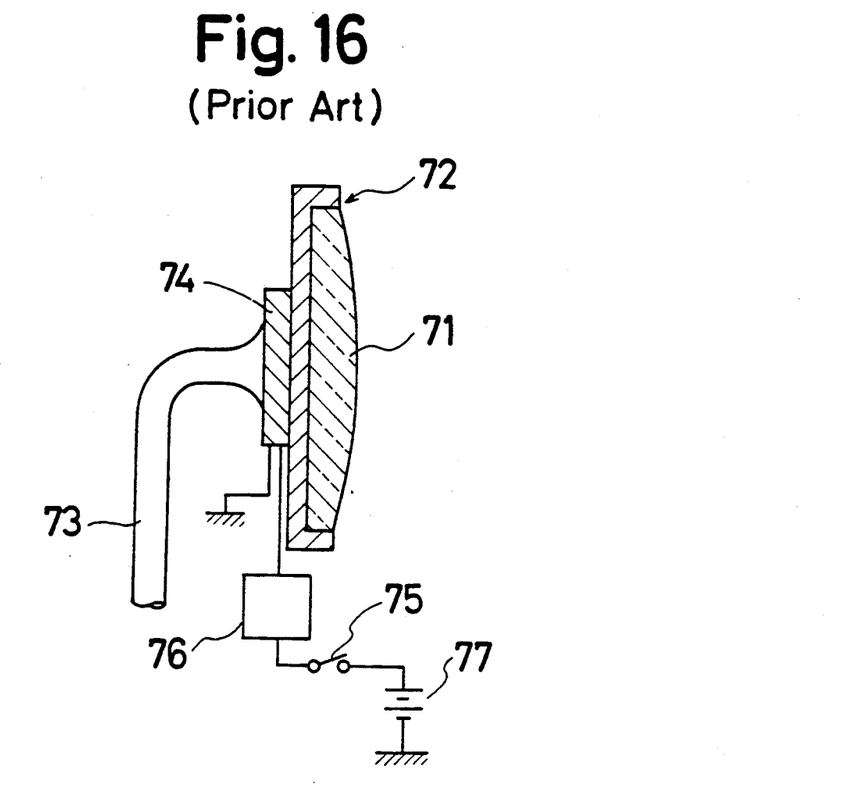
FIG. 16 is a cross sectional view of a conventional automotive rear view mirror.

FIG. 16 is a cross sectional view of the cleaning apparatus disclosed in the laid open patent No. 61-30552. Therein, a mirror 71 is supported by a frame 72. The frame 72 is supported by a support 73. A piezoelectric vibrator 74 is interconnected between the frame 72 and the support 73. The piezoelectric vibrator 74 is connected to a driving circuit 76. A power switch 75, which is located in the vehicle (not shown), is interconnected between the driving circuit 76 and a battery 77. While the switch 75 is turned on, the mirror 71 is oscillated by the vibrator 74. When the mirror 71 is vibrated, water droplets are atomized and are removed from the surface of the mirror 71.

However, the cleaning apparatus utilizing the heater arrangement 82 takes a long time for removing the water droplets, due to the length of time required to heat the mirror 71 sufficiently.

Further, the other cleaning apparatus utilizing the vibrator 74 takes a long time for removing ice and frost, because the vibrator 74 cannot heat the mirror 71 to a large degree.

SUMMARY OF THE INVENTION

Accordingly, one of the objects of this invention is to obviate the above conventional drawbacks.

It is also an object of this invention to rapidly remove foreign substances such as water droplets, frost and ice from a plate shaped member.

To achieve the above objects, and in accordance with the principles of the invention as embodied and broadly described herein, the self-cleaning apparatus for an automotive rear view mirror includes a transparent member, a metal layer for reflecting incident light, and for receiving electric current supplied thereto.

DESCRIPTION OF THE DRAWINGS

The accompanying drawings, which are incorporated in and constitute a part of the specification, illustrate an embodiment of the invention, and, together with the description, serve to explain the principles of the invention. Of the drawings.

DETAILED DESCRIPTION OF THE PREFERRED EMBODIMENT

Reference will now be made in detail to the present preferred embodiment of this invention, an example of which is illustrated in the accompanying drawings.

A thin metal layer 12 is formed or provided on one side of a transparent glass plate 11. The glass plate 11 could be curved so as to provide a convex mirror surface and the thin metal layer 12 could be prepared by a vapor deposit method or a spattering method. The mirror 1 comprises the glass plate 11 and the thin metal layer 12 as a reflecting layer. An isolating layer 13 is provided on the thin metal layer 12 and positioned adjacent the automotive body. The isolating layer 13 could be prepared by printing an isolating substance on the thin metal layer 12. The isolating layer 13 provides a flat surface on which a piezoelectric vibrator 20 and connecting terminals 14a, 14b are adhered, the isolating layer 13 being larger than the piezoelectric vibrator 20.

Two electrodes 15a, 15b are formed on the thin metal layer 12 and the isolating layer 13. The electrodes 15a, 15b could be prepared by baking silver compounds or other known manner. The electrodes 15a, 15b are electrically connected to the connecting terminals 14a, 14b. One end of the electrodes 15a, 15b are mounted on the connected terminals 14a, 14b. Two conductive wires 16a, 16b are connected to the terminals 14a, 14b.

The piezoelectric vibrator 20 is of substantially a rectangular shape and includes a piezoelectric element 22 and electrodes 21, 23. Conductive wires 20 are connected to the electrodes 21, 23 electrically and mechanically by caulking or pressing.

Figure 1:
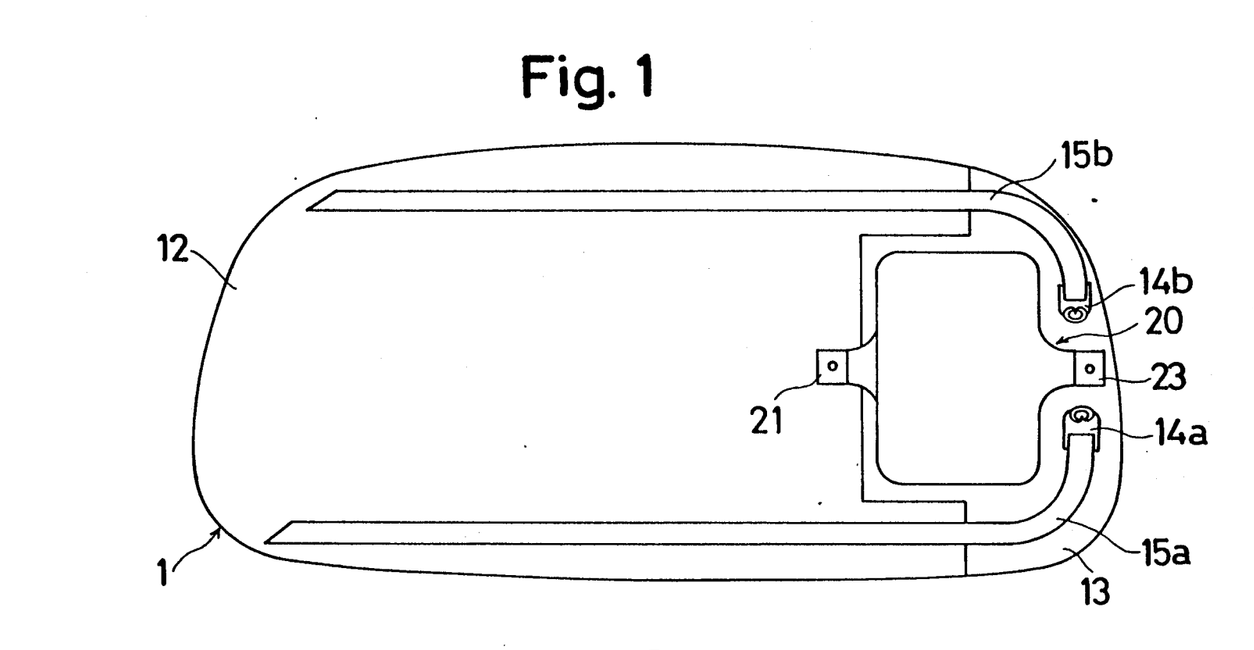
FIG. 1 is a plane view of an automotive rear view mirror relating to the present invention.
Figure 2:
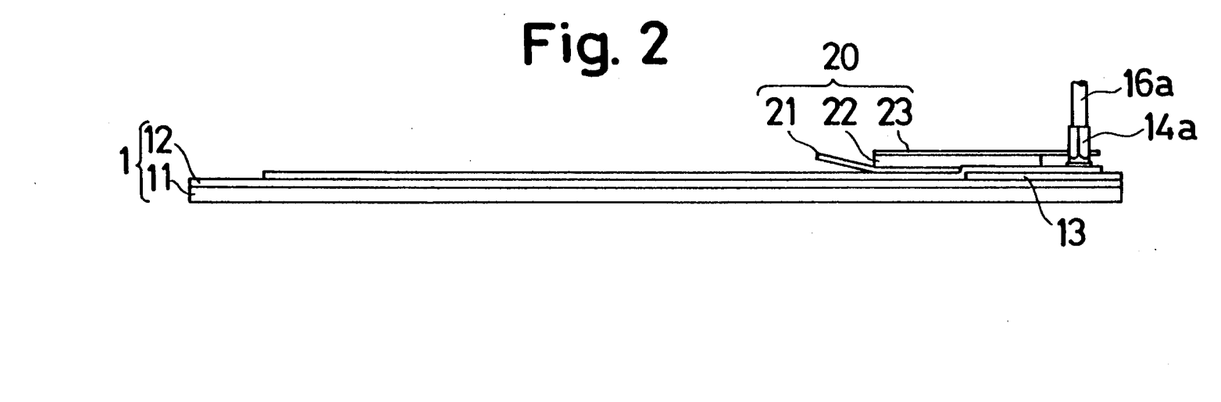
FIG. 2 is a left side view of an automotive rear view mirror relating to the present invention.

The piezoelectric vibrator 20 expands and contracts in both the up and down direction of FIG. 2 and in the right and left direction of FIG. 2. In this embodiment, the mirror 1 is mainly oscillated by the vibrations in the right-left direction of the piezoelectric vibrator 20, because the piezoelectric vibrator 20 can resonate at a low frequency. However, the mirror 1 can be oscillated in the up-down direction of the piezoelectric vibrator 20.

Figures 3, 4:
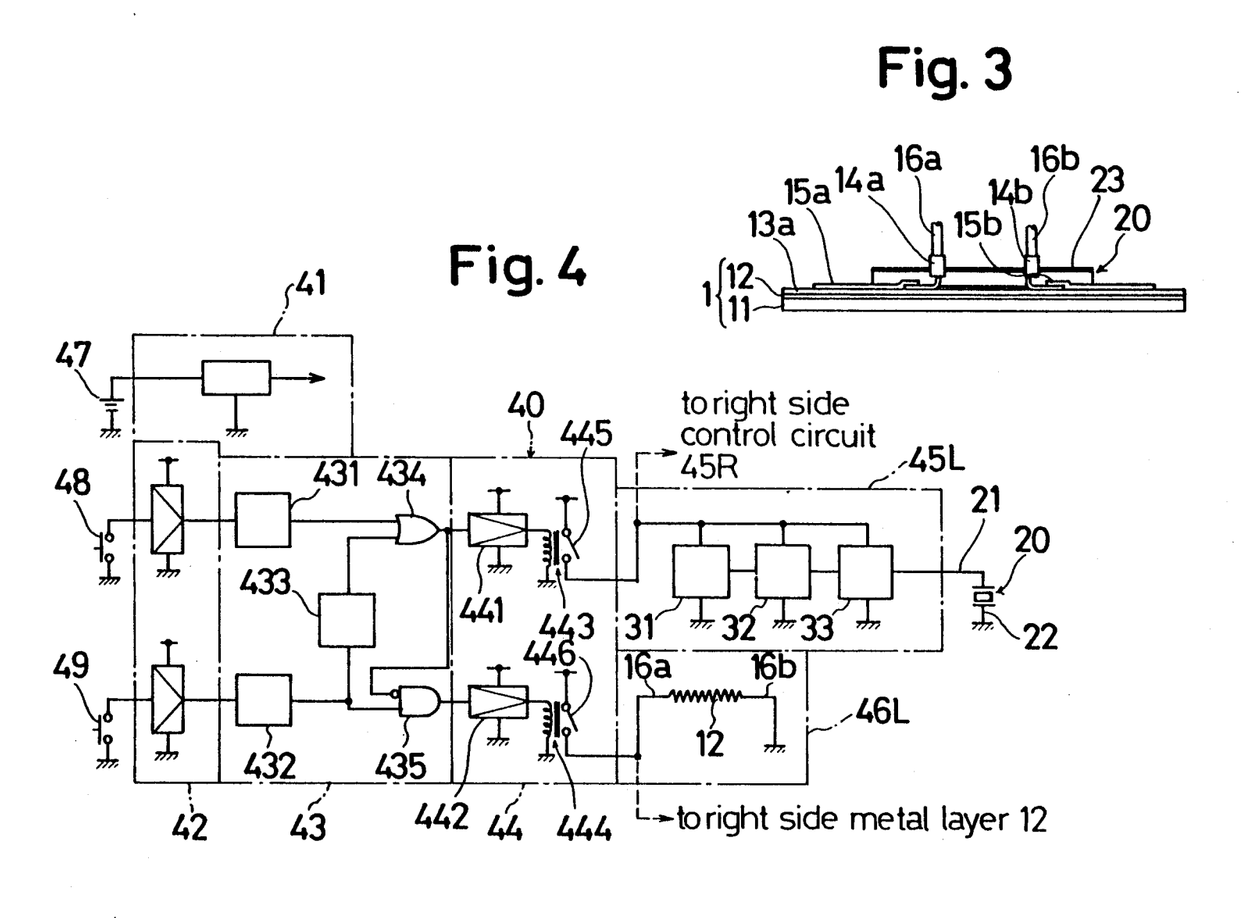
FIG. 3 is a right side view of an automotive rear view relating to the present invention.
FIG. 4 is a block diagram of a control circuit relating to the present invention.

Referring to FIG. 4, a control circuit 40 controls operation of the mirror. The control circuit 40 comprises a power supply 41, and input buffer 42, a timer circuit 43 and a relay circuit 44. The control circuit 40 is disposed in a compartment of the automobile and separately from vibration control circuits 45L, 45R. The input buffer 42 and the timer circuit 43 receive electric power from the power supply 41 connected to a battery 47 on the automobile.

A start switch 48 is also disposed in the compartment of the vehicle. The start switch 48 is connected to the input buffer 42. The input buffer 42 generates an "L" level signal while the switch 40 is turned on. Contrary, the input buffer 43 generates an "H" level signal while the switch 48 is turned off. The timer circuit 431 generates an "H" level signal for a predetermined period of time (5 seconds in this embodiment) after the input buffer 42 generates the "L" level signal relating to the start switch 48.

A heater switch 49 is also disposed in the compartment of the vehicle. The heater switch 49 is also connected to the input buffer 42. The input buffer 42 generates an "L" level signal while the switch 49 is turned on. Contrary, the input buffer 42 generates an "H" level signal while the switch 40 is turned off. The time circuit 431 generates an "H" level signal for a predetermined period of time (5 seconds in this embodiment) after the input buffer 42 generates the "L" level signal relating to the heater switch 49.

An oscillation circuit 433 is connected to the timer circuit 432. The oscillation circuit 433 generates an alternating signal while the "H" level signal is generated from the timer circuit 432. The alternative signal has a repeating pattern which includes "H" level of 5 seconds and "L" level of 30 seconds.

Relay drivers 441, 442 are controlled by a "OR" gate 434 and an inhibit gate 435. Each relay driver 441, 442 turns on each relay 443, 444 in response to the "H" level signals from the gates 434, 435.

Figure 5:
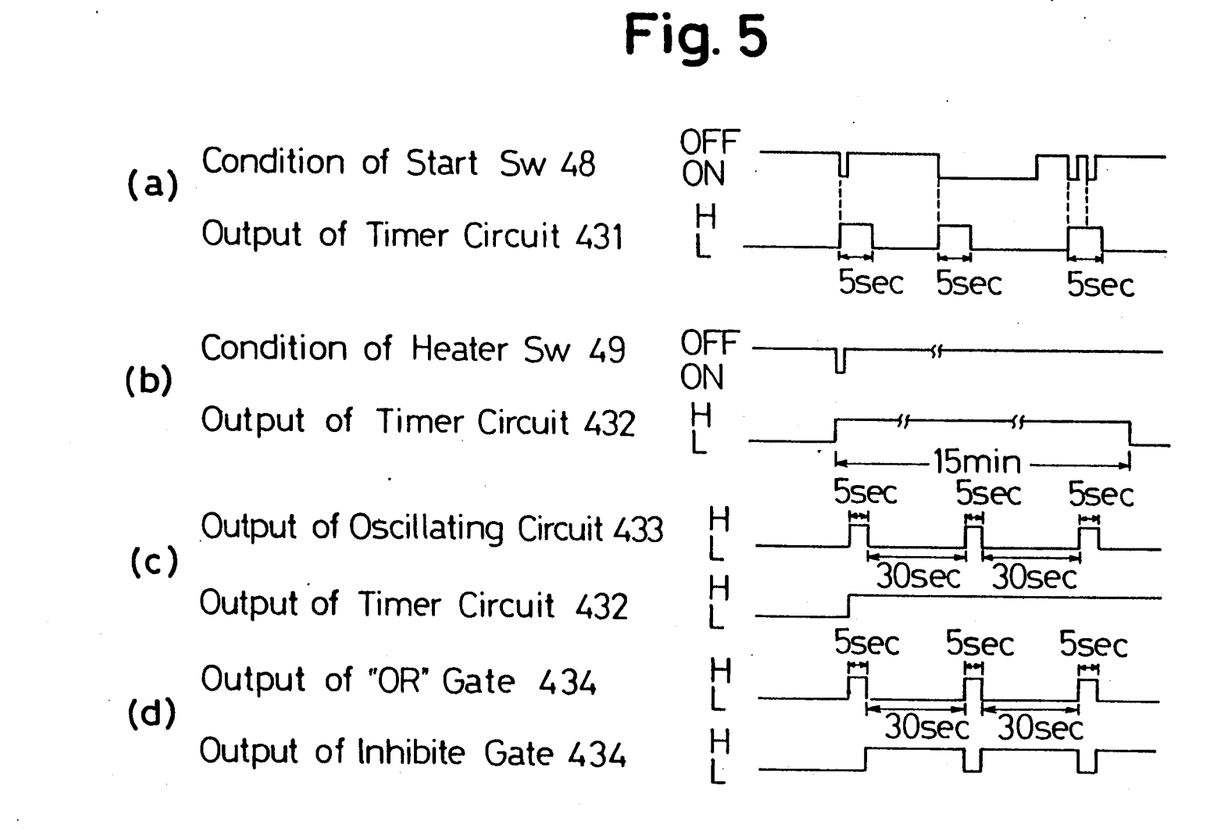
FIG. 5 is a timing chart of the timer circuit relating to the present invention.

As shown in FIG. 5, a contact 445 of the relay 443 is closed for 5 seconds in response to actuation of the start switch 48, because the "H" level signal is supplied from the timer circuit 431 to the relay driver 441 through the "OR" gate 434. Further, a contact 445 of the relay 443 is closed for 5 seconds in response to actuation of the heater switch 49, because the "H" level signal is supplied from the oscillating circuit 433 to the relay driver 441 through the "OR" gate 434. After actuation of the heater switch 49, a contact 446 of the relay 444 is also closed for 30 seconds, because the "H" level signal is supplied from the timer circuit 432 to the relay driver 442 through the inhibit gate 435. The inhibit gate 435 prevents the electric power from being supplied to both the piezoelectric vibrator 20 and the metal layer at the same time.

The control circuit 40 supplies electric power to the vibration control circuits 45L, 45R and heater circuit 46L, 46R. Only the vibration control circuits 45L, 45R and the heater circuits 46L, 46R are installed in left and right automotive rear-view mirrors (not shown).

The relay 443 connects the vibration control circuit 45L, 45R to the battery 47. The vibration control circuit 45R is the same circuit as the control circuit 45L. Therefore, an explanation for the control circuit 45R is omitted in this specification.

The control circuit 45L comprises a frequency control circuit 31, a voltage controlled oscillator circuit 32 and a driving circuit 33. The frequency control circuit 31 periodically generates a saw-tooth wave voltage which varies a voltage level in response to the elapsed time. The voltage controlled oscillator 32 varies the generated frequency in response to the varied voltage level from the frequency control circuit 31. The driving circuit 33 increases the voltage of the signal which is fed from the voltage controlled oscillator 32, and supplies the high voltage signal to the piezoelectric vibrator 20. As long as the frequency of the control circuit 45L is properly determined, the mirror 1 may be resonated by the piezoelectric vibrator 20 so that a standing wave is generated on the mirror 1 due to resonation of the mirror. When the mirror 1 is resonated, water droplets are atomized and removed from the mirror 1.

The control circuit 45L varies the frequency which is supplied to the piezoelectric vibrator 20. Therefore, nodes and loops of the standing wave are moved around the mirror 1 so as to remove the water droplets uniformly from the whole of the mirror 1.

The relay 444 connects the heater circuit 46L, 46R to the battery 47. The heater control circuit 46R is the same circuit as the control circuit 46L. Therefore, an explanation for the control circuit 46R is omitted in this specification.

While the heater circuit 46L is connected to the battery 47, the electric current flows the metal layer 12 and the metal layer 12 generates heat. The frost and ice are melted by generating heat from the metal layer 12 and removal by the vibration of the mirror 1.

In this embodiment, the metal layer 12 is also utilized as the reflecting layer of the mirror 1. Therefore, a separate or additional heater is not required.

Figure 6A:
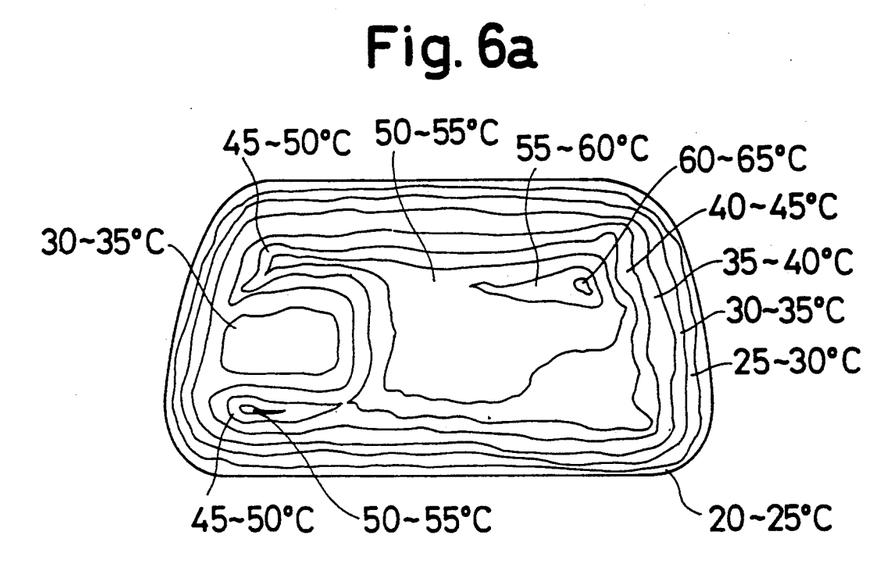
FIG. 6a and FIG. 6b are heat distribution charts relating to the present invention.
Figure 6B:
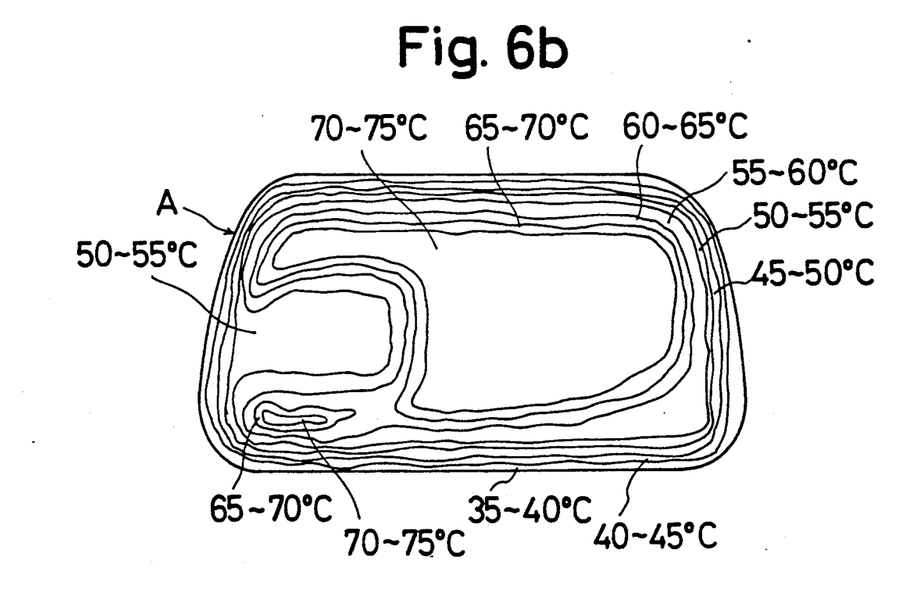
Figure 7A:
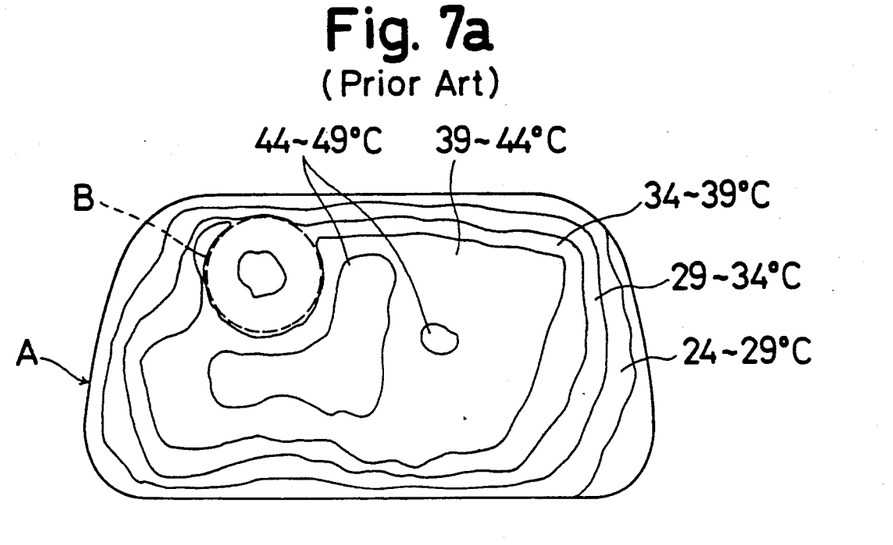
FIG. 7a and FIG. 7b are heat distribution charts relating to a conventional apparatus.
Figure 7B:
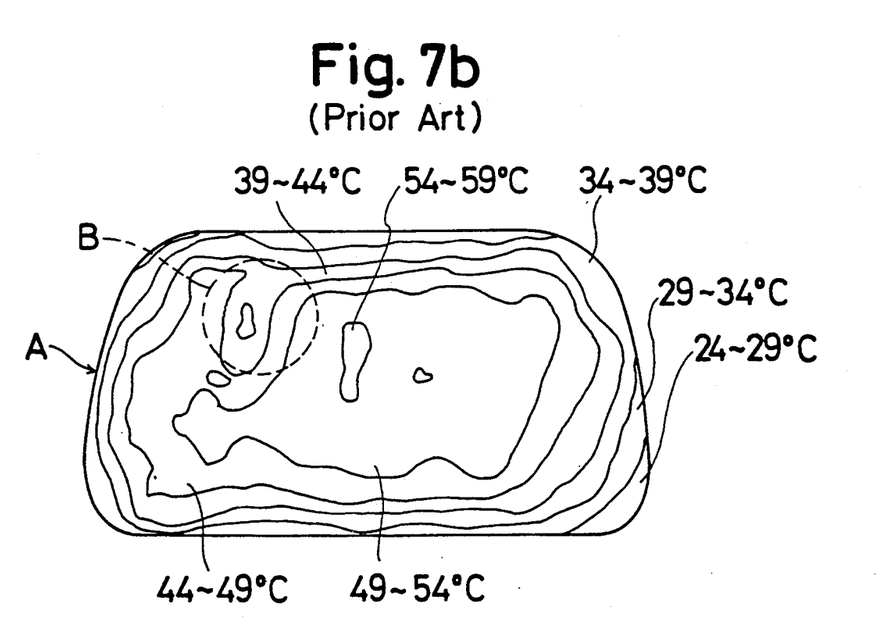

FIG. 6a shows thermal contour lines relating to this embodiment after supplying the electric current to the metal layer 12 for 30 seconds. Further, FIG. 6b shows other thermal contours lines relating to this embodiment after supplying the electric current to the metal layer 12 for 60 seconds. In comparison, FIG. 7a shows thermal contour lines of a conventional rear view mirror after supplying the electric current for 1 minute. Further, FIG. 7b shows other thermal contour lines of the conventional rear view mirror after supplying the electric current for 5 minutes.

Over 50° C. is required for quickly removing frost and ice. As shown in FIGS. 7a and 7b, the conventional rear view mirror needs more than 5 minutes before the temperature exceeds 50° C. Further, only 30% of the mirror 1 exceeds 50° C. after 5 minutes.

However, in the mirror of the present invention as shown in FIGS. 6a and 6b, about 80% of the mirror 1 exceeds 50° C. after 60 seconds. Further, the heat is delivered more uniformly than in the conventional rear view mirror. Even on the portion of the mirror where the piezoelectric vibrator 20 is located, the temperature exceeds 50° C. after 60 seconds. Thus, in this embodiment, the mirror 1 can be heated more quickly and more uniformly than the conventional rear view mirror. Therefore, the frost and ice can be quickly removed from the whole of the mirror 1.

Figure 8:
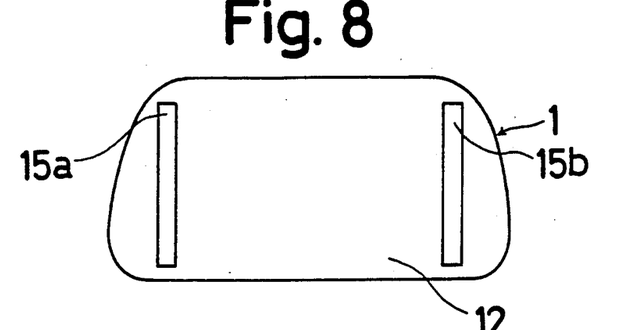
FIGS. 8, 9, 10 and 11 are other plane views of an automotive rear view mirror relating to the present invention.
Figure 9:
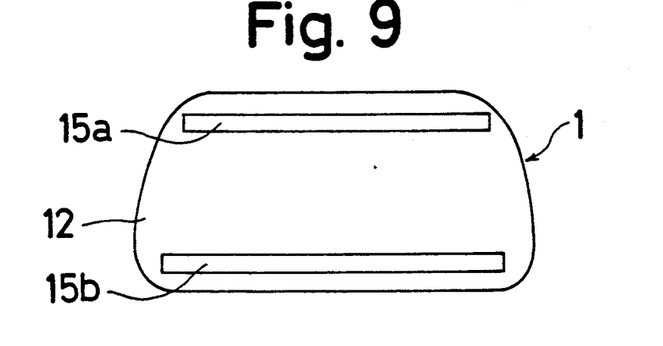
Figure 10:
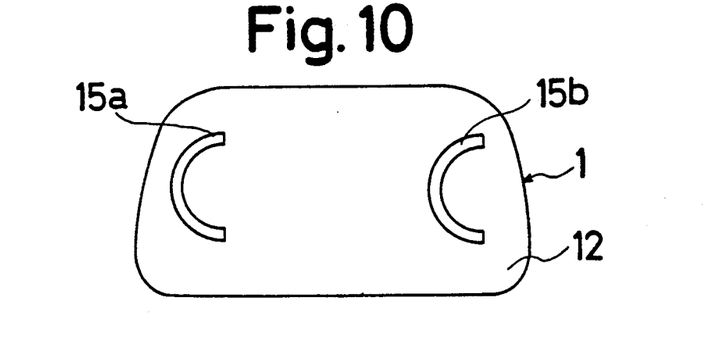
Figure 11:
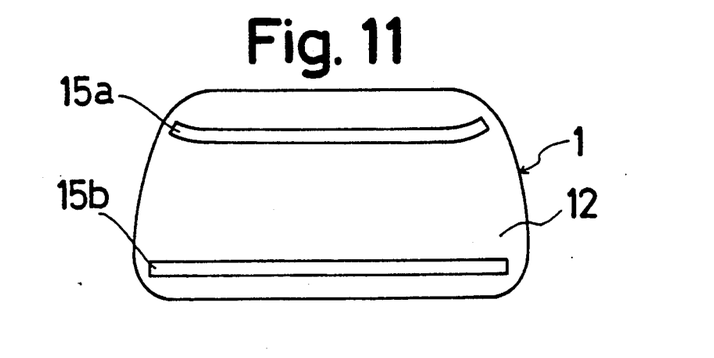

Shapes of the two electrodes 15a, 15b could be modified. FIGS. 8, 9, 10 and 11 show samples of modified electrodes. In FIG. 8, the electrodes are parallel with each other and extend in the vertical direction while FIG. 9 shows the electrodes being parallel and extending in the horizontal direction. In FIG. 10 the electrodes are substantially U-shaped with their ends spaced vertically on the mirror. FIG. 11 provides an arrangement similar to that of FIG. 9, however, electrode 15a is not parallel as end portions are curved so as to extend in the direction of the corners of the mirror.

Figure 12:
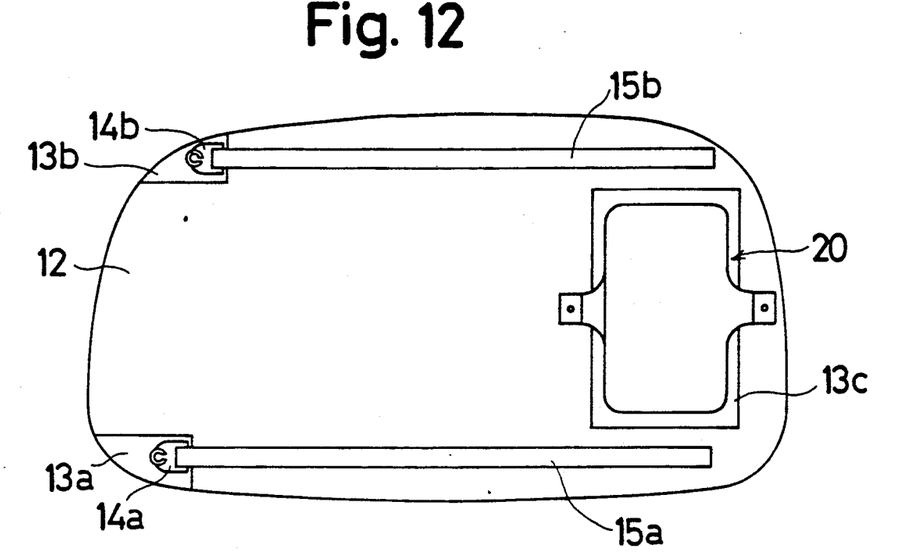
FIG. 12 is a plane view of an automotive rear view mirror relating to the present invention.

The single isolating layer 13 is formed on the thin metal layer 12. However, the isolating layer 13 can be divided into two or more parts, if necessary. FIG. 12 shows a sample of separate isolating layers 13a, 13b, 13c.

Figure 14:
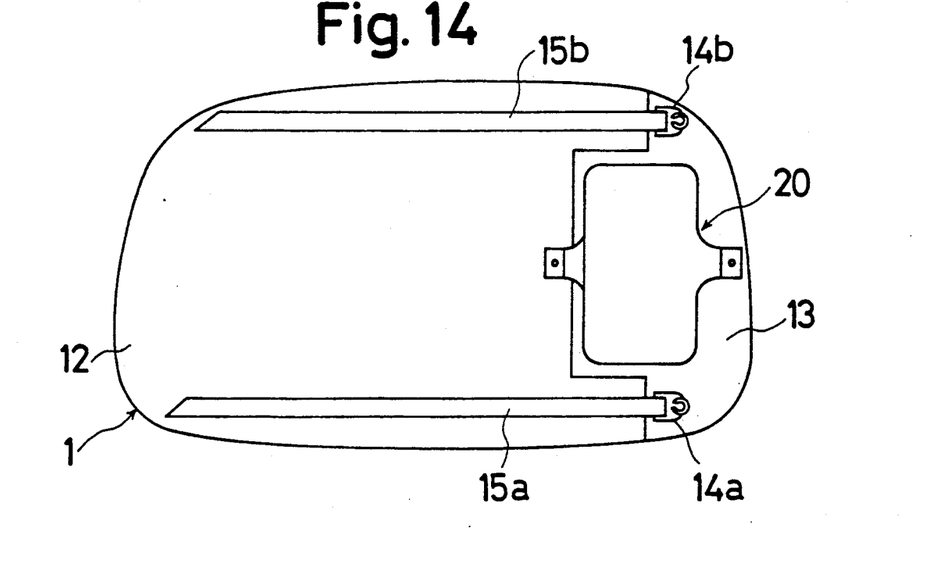
FIG. 14 is a perspective view of an automotive rear view mirror relating to a conventional apparatus.

Further, the terminals 14a, 14b can be located on various parts of the mirror 1. In FIG. 12 the connected terminals 14a, 14b are located on opposite sides of the piezoelectric vibrator 20. In FIG. 14, the connected terminals 14a, 14b are located on both sides of the piezoelectric vibrator 20.

Figure 13:
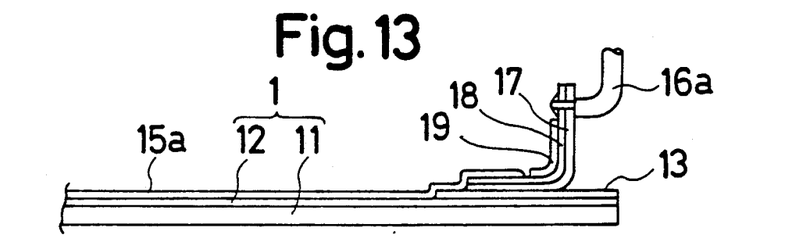
FIG. 13 is a partial side view of an automotive rear view mirror relating to the present invention.

FIG. 13 shows another arrangement of the terminals which use a flexible circuit board including a thin copper film 18 and cover coat resins 17, 19. In this type of terminal, the cover coat resin 17 is adhered to the isolating layer 13. The electrodes 15a, 15b are located and connected onto the copper film 18. With this construction, the terminals are strongly fixed to the isolating layer. Further, vibration of the mirror becomes more difficult to transmit to the conductive wire 16a, 16b. Accordingly, mirror 1 can vibrated without any interference of conducting wires 16a, 16b.

Figure 15:
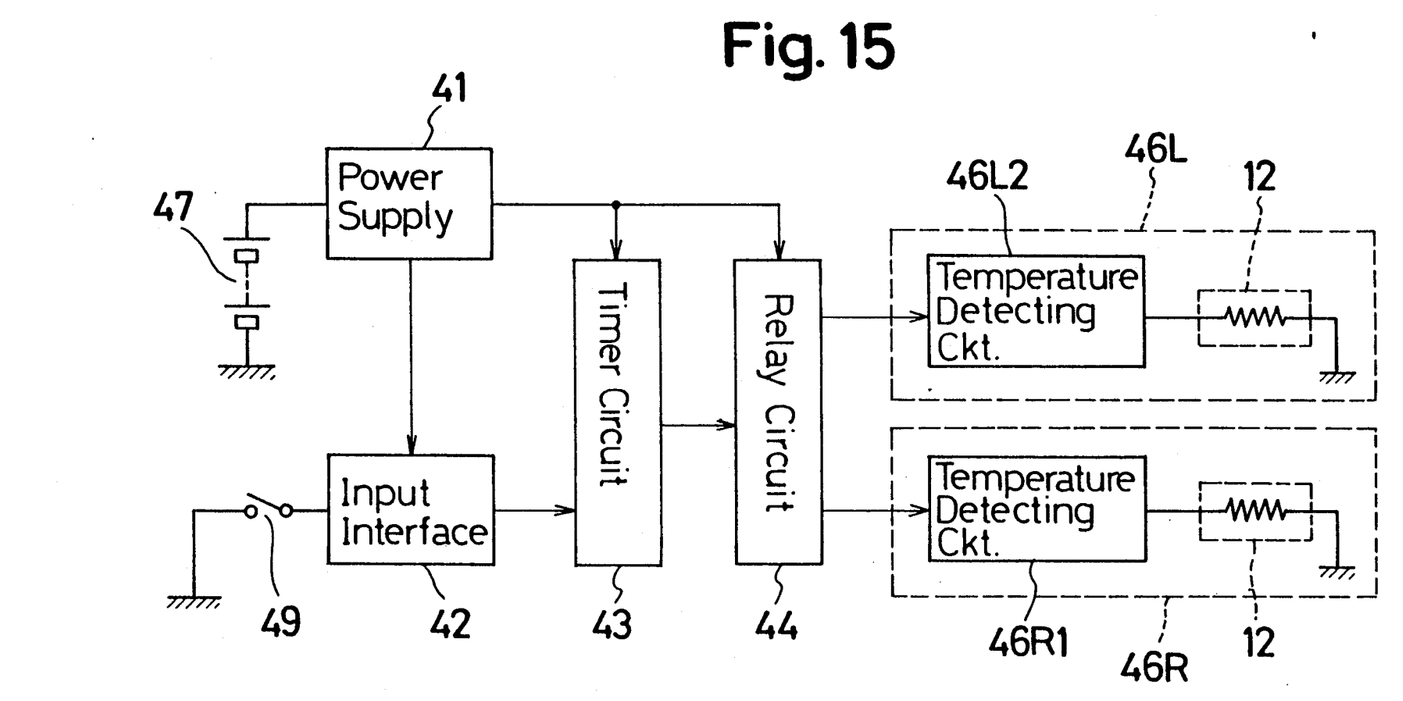
FIG. 15 is a block diagram of a control circuit relating to the present invention.

FIG. 15 shows a modified circuit of the control circuit 40. A left side heater circuit 46L and a right side heater circuit 46R include temperature detecting circuits 46L2, 46R1. The temperature detecting circuits 46L2, 46R1 control the electric current transmitted to the metal layers 12 in response to the temperature on the mirror 1. When the heater switch 49 is tuned on, the electric current is supplied from power supply 41 to the metal layers 12 through the relay circuit 44 and the temperature detecting circuits 46L2, 46R1. In the embodiment of FIG. 15, frost, ice and water drops are removed by evaporation.

The principles, preferred embodiments and modes of operation of the present invention have been described in the foregoing application. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

What is claimed is:

1. A self-cleaning apparatus for an automotive rear view mirror comprising:

a transparent member;

a metal layer provided on one side of the transparent member for reflecting incident light; and means for transmitting an electric current to the metal layer;

vibrating means for vibrating the transparent member;

vibration controlling means for driving the vibration means at a predetermined frequency; and an isolating layer positioned between the metal layer and the vibrating means.

2. A self-cleaning apparatus as in claim 1, further comprising;

a pair of opposed electrodes provided on the metal layer.

3. A self-cleaning apparatus as in claim 2, wherein said vibrating means is oriented for providing radially directed vibrations to said transparent member.

* * * * *